United States Patent [19]

Lambousy et al.

[11] Patent Number: 4,715,996
[45] Date of Patent: Dec. 29, 1987

[54] BUBBLE CAP ASSEMBLY

[75] Inventors: George G. Lambousy, Texas City; Benjamin H. Reaves, West Texas City; William E. Nelson, Dickinson, all of Tex.

[73] Assignee: Amoco Corporation, Chicago, Ill.

[21] Appl. No.: 925,325

[22] Filed: Oct. 31, 1986

[51] Int. Cl.⁴ .............................................. B01F 3/04
[52] U.S. Cl. ................................ 261/114.2; 422/143; 261/64.1
[58] Field of Search ........................... 261/114.2, 64.1; 422/143

[56] References Cited

U.S. PATENT DOCUMENTS

| | | |
|---|---|---|
| 57,132 | 8/1866 | Hickman . |
| 76,201 | 3/1868 | Kirk . |
| 257,778 | 5/1882 | Stearns, Jr. . |
| 257,788 | 5/1882 | Tyler . |
| 281,344 | 7/1883 | Crandal . |
| 394,537 | 12/1888 | Griffin . |
| 396,691 | 1/1889 | Griffin . |
| 405,632 | 6/1889 | Warren . |
| 494,338 | 3/1893 | Rochelle . |
| 514,397 | 2/1894 | Walsh, Jr. . |
| 527,179 | 10/1894 | Litzinger . |
| 549,529 | 11/1895 | Pfeiffer et al. . |
| 608,162 | 7/1898 | Swisher . |
| 613,630 | 11/1898 | Himes . |
| 626,271 | 6/1899 | Daly . |
| 753,415 | 3/1904 | Mack . |
| 858,549 | 7/1907 | West et al. . |
| 860,758 | 7/1907 | Morey . |
| 873,424 | 12/1907 | Greene . |
| 923,264 | 6/1909 | Hathcox . |
| 929,827 | 8/1909 | Bryar . |
| 950,123 | 2/1910 | Stevenson . |
| 950,282 | 2/1910 | Ferguson . |
| 968,991 | 8/1910 | Shafer . |
| 970,274 | 9/1910 | Spencer . |
| 982,763 | 1/1911 | Blakey . |
| 1,033,759 | 7/1912 | Humason . |
| 1,041,832 | 10/1912 | Martin . |
| 1,077,080 | 10/1913 | Jones . |
| 1,089,175 | 3/1914 | Wilson . |
| 1,130,851 | 3/1915 | Shekleton . |
| 1,202,893 | 10/1916 | Regal . |
| 1,208,620 | 12/1916 | Moser . |
| 1,235,717 | 8/1917 | Moser . |
| 1,287,371 | 12/1918 | McClay . |
| 1,288,482 | 12/1918 | Biggs . |
| 1,308,505 | 7/1919 | Parker . |
| 1,333,529 | 3/1920 | Anderson . |
| 1,378,116 | 5/1921 | Holmes et al. . |
| 1,382,306 | 6/1921 | Marr . |
| 1,552,681 | 9/1925 | Davis . |
| 1,578,160 | 3/1926 | Monroe . |
| 1,598,165 | 8/1926 | Stevenson . |
| 1,617,914 | 2/1927 | Katter John . |
| 1,634,744 | 7/1927 | Edwards . |
| 1,707,931 | 4/1929 | Gibbons . |
| 1,733,529 | 10/1929 | Dorsey . |
| 1,816,192 | 7/1931 | Nagano . |
| 1,881,935 | 10/1932 | Powis . |
| 1,896,650 | 2/1933 | Trotter . |
| 1,898,801 | 2/1933 | Wilkinson . |
| 1,934,972 | 11/1933 | Frank . |
| 1,951,228 | 3/1934 | Woodward . |
| 2,031,530 | 2/1936 | Essick . |
| 2,290,056 | 7/1942 | Koubek . |
| 2,374,403 | 4/1945 | Yarnall . |
| 2,384,668 | 9/1945 | Ensinger et al. . |
| 2,785,882 | 3/1957 | Wansink et al. ................. 261/114.2 |
| 2,797,907 | 7/1957 | De Bie ............................. 261/114.2 |
| 2,950,944 | 8/1960 | Cooney . |
| 3,318,355 | 5/1967 | Dwyer . |
| 3,421,563 | 1/1969 | Koss . |
| 3,475,134 | 10/1969 | Weber et al. ......................... 422/143 |
| 4,192,835 | 3/1980 | Powers ............................. 261/114.2 |
| 4,286,807 | 9/1981 | Bachli . |

Primary Examiner—Tim Miles
Attorney, Agent, or Firm—Thomas W. Tolpin; William H. Magidson; Ralph C. Medhurst

[57] ABSTRACT

A bubble cap assembly is provided with keyways and a special keyed lock washer with locking tabs to securely fasten the bubble cap during operation in a reactor. The unique arrangement also accommodates simple removal for easy maintenance and decoking without damaging the bubble cap assembly.

14 Claims, 11 Drawing Figures

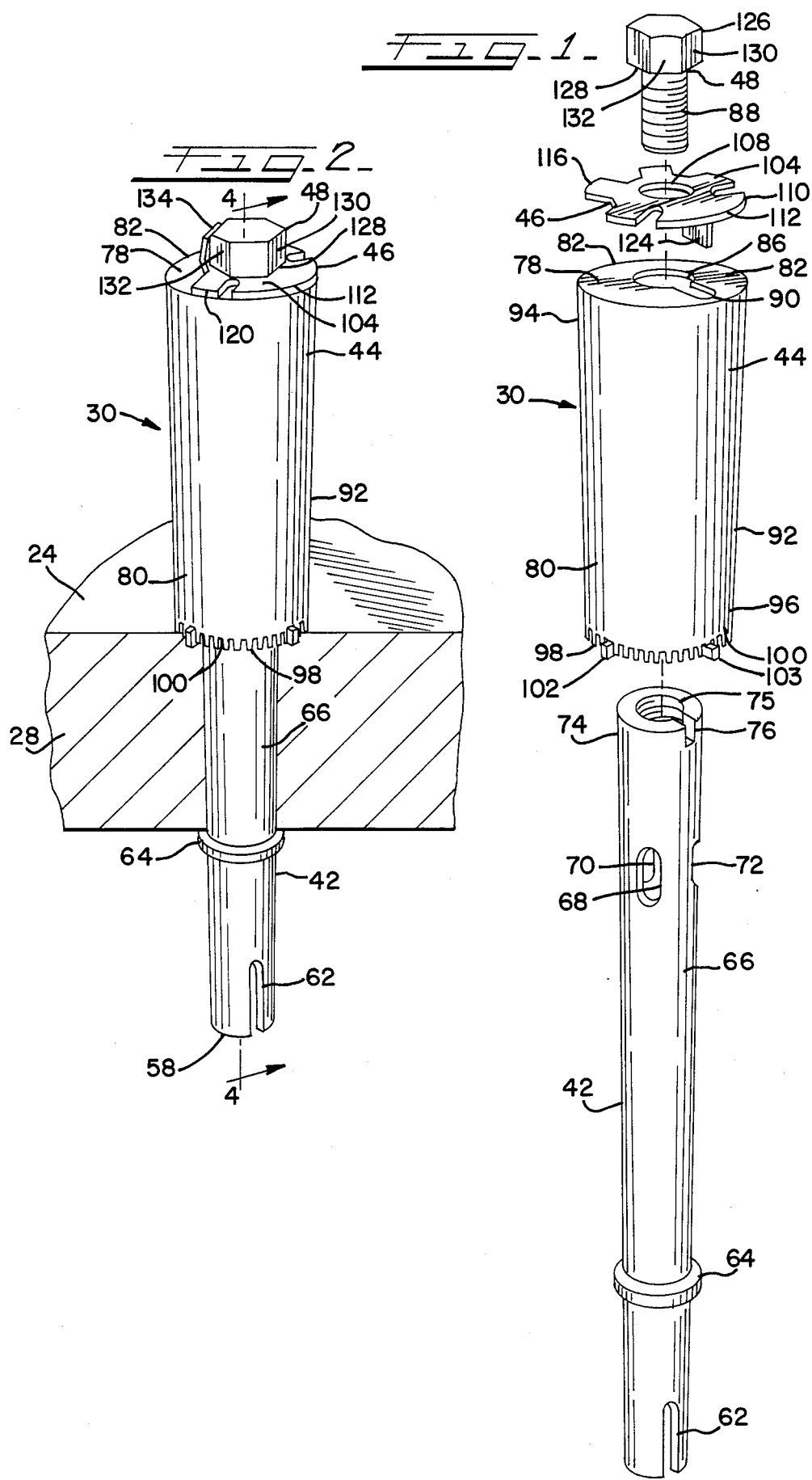

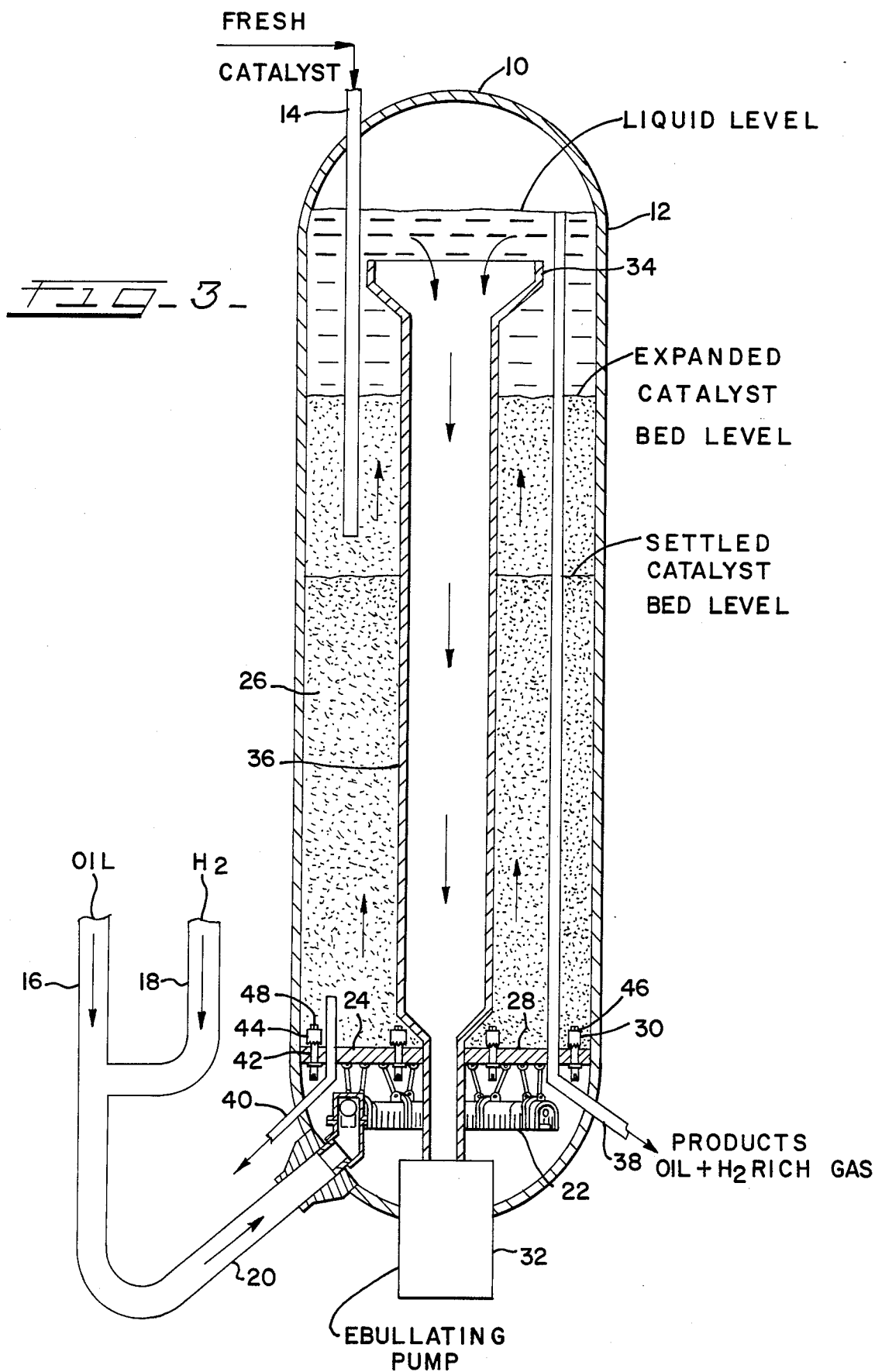

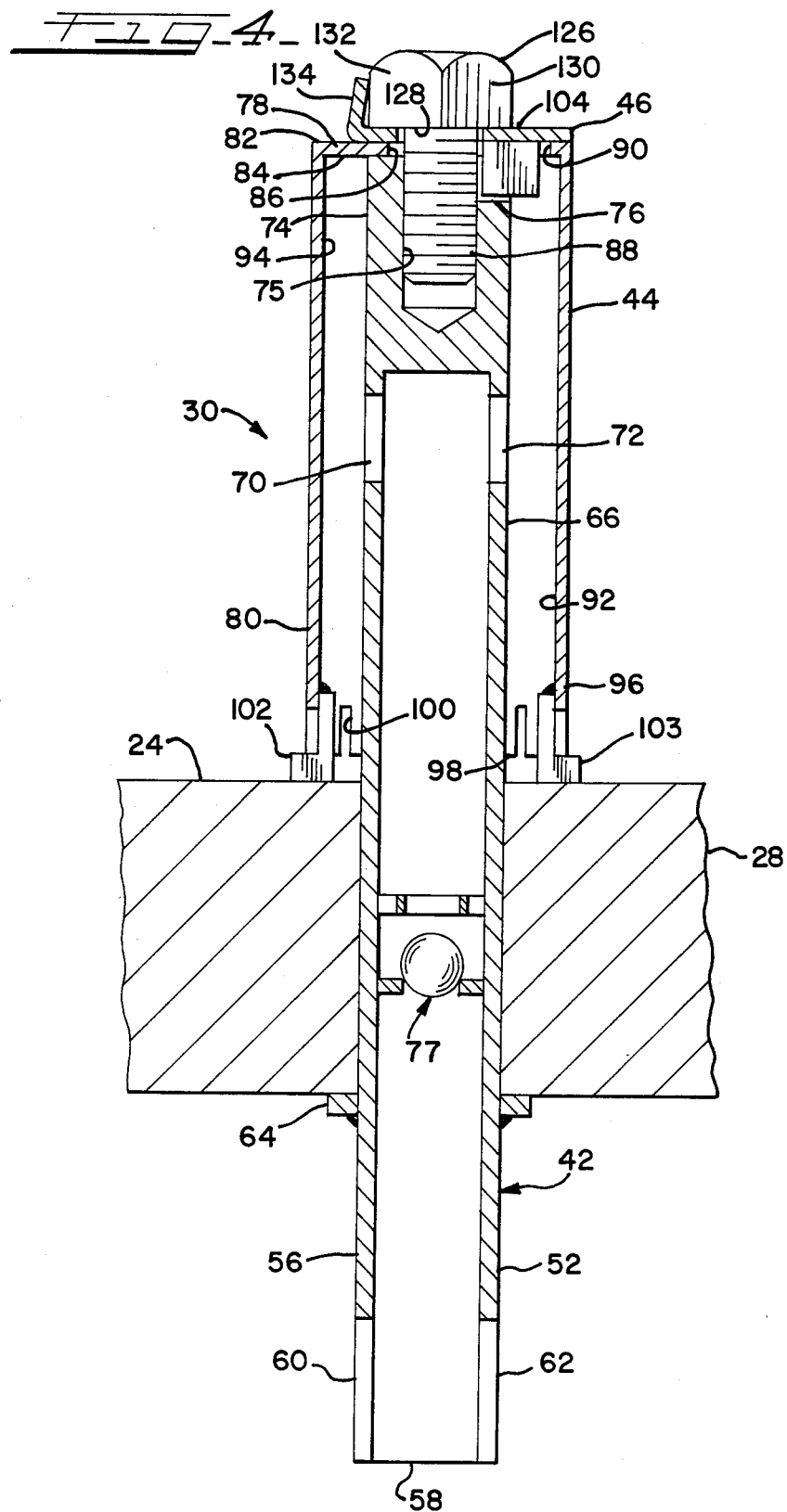

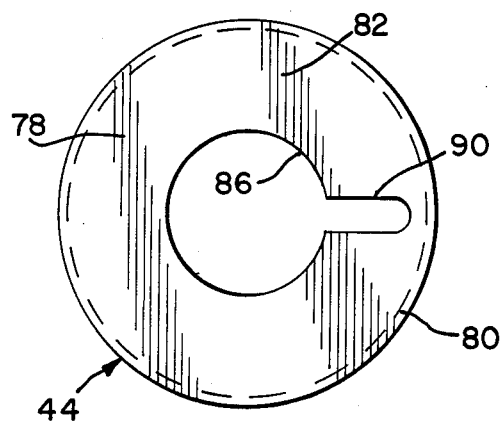
Fig_5_
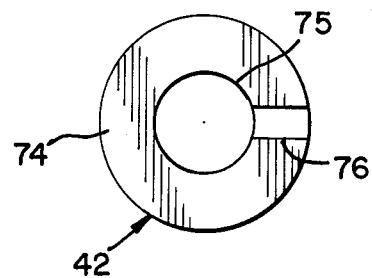
Fig_6_
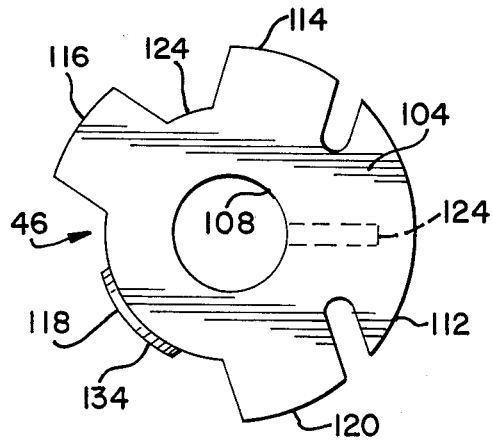
Fig_7_
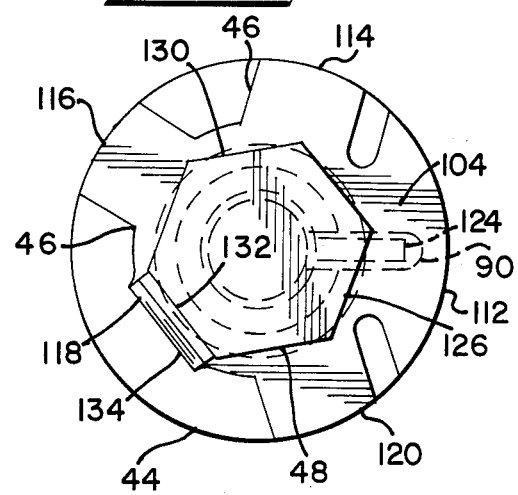
Fig_8_

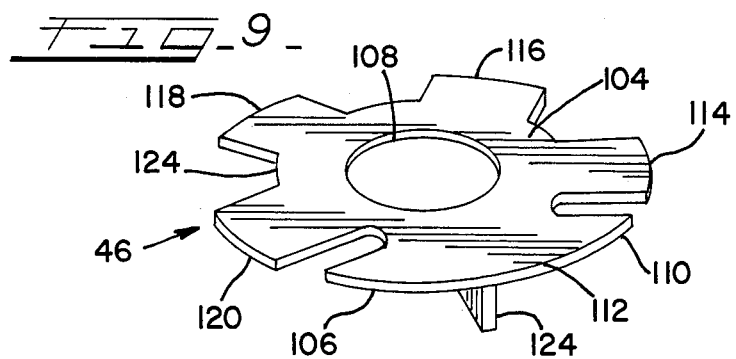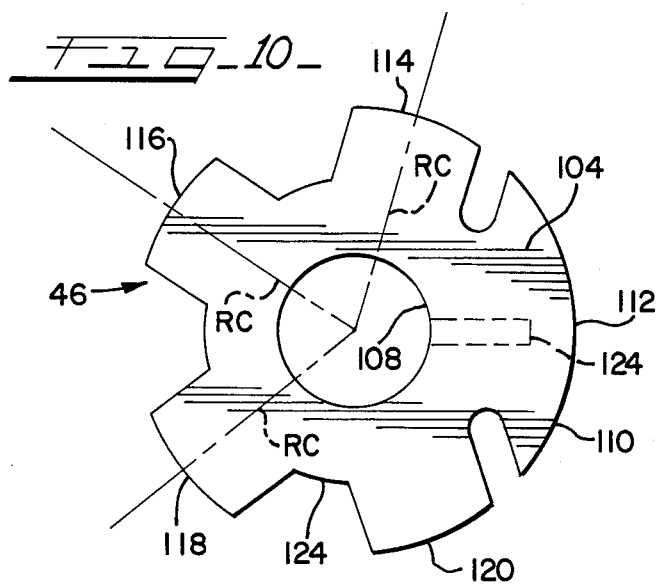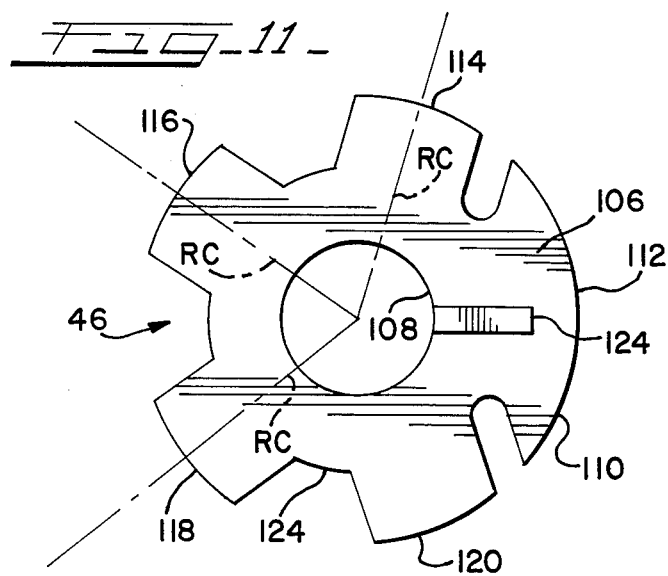

BUBBLE CAP ASSEMBLY

BACKGROUND OF THE INVENTION

This invention relates to reactors in petroleum refineries and, more particularly, to bubble caps for use in reactors.

In ebullated (expanded) bed reactors, hundreds of bubble caps are used to help provide for uniform flow distribution of the oil feed. Conventional bubble caps are keyed to risers and tack welded or back welded to cap screws. Periodically, the reactors must be shut down for maintenance and removal of coke buildup.

In order to disassemble or remove conventional bubble caps for maintenance and decoking, it is usually necessary to grind the welds off the cap screws or, alternatively, remove the cap screws with an impact wrench. Such grinding is very tedious, time consuming, and expensive, particularly since the reactors contain hundreds, and sometimes thousands, of bubble caps. Impact wrenches often create severe torques which can shear the keys and damage the bubble caps. After the bubble caps are decoked and their associated check valves are cleaned or replaced, the sheared keys must be repaired or replaced. Such repair and replacement are very cumbersome, laborious, and expensive. It also requires rewelding, such as Heliarc welding with a tungsten inert gas, which may not be effective if there is not enough weld metal to secure and rebuild the keys. Once the keys are restored, rebuilt, and repaired, the cap screws must again be back welded to the bubble caps. This procedure greatly increases the downtime of the reactor and the expense of maintenance and decreases the profitability of the refinery.

Furthermore, occasionally during operation of the unit, the back welds of the cap screws will break and the cap screws will unscrew. This can lead to additional shutdown of the reactor, which is very expensive and unde- sirable.

Over the years, a variety of lock washers, lock nuts, and other locking devices have been developed. Typifying these prior-art lock washers, lock nuts, and other locking devices are those found in U.S. Pat. Nos. 57,132, 76,201, 257,778, 257,788, 281,344, 394,537, 396,691, 405,632, 494,338, 514,397, 527,179, 549,529, 608,162, 613,630, 626,271, 753,415, 858,549, 860,758, 873,424, 923,264, 929,827, 950,123, 950,282, 968,991, 970,274, 982,763, 1,033,759, 1,041,832, 1,077,080, 1,089,175, 1,130,851, 1,202,893, 1,208,620, 1,235,717, 1,287,371, 1,288,482, 1,308,505, 1,333,529, 1,378,116, 1,382,306, 1,578,160, 1,598,165, 1,617,914, 1,634,744, 1,707,931, 1,733,529, 1,816,192, 1,881,935, 1,896,650, 1,898,801, 1,934,972, 1,951,228, 1,552,681, 2,031,530, 2,290,056, 2,374,403, 2,384,668, 2,950,944, 3,318,355, 3,421,563, and 4,286,807. These prior-art lock washers, lock nuts, and locking devices have met with varying degrees of success. None of these lock washers, lock nuts, and locking devices, however, have been used with bubble caps.

It is, therefore, desirable to provide an improved bubble cap assembly which overcomes most, if not all, of the preceding problems.

SUMMARY OF THE INVENTION

An improved bubble cap assembly is provided for use in reactors of oil refineries. Advantageously, the novel bubble cap assembly is readily assembled without welding, is securely locked during use in the reactor, and is easy to disassemble and maintain. Desirably, the novel bubble cap assembly minimizes downtime and maintenance expenses, significantly improves the profitability of the unit, and is easy to install and use. The unique bubble cap assembly is also efficient, effective, and reliable.

To this end, the novel bubble cap assembly has a tubular riser with a notch that provides a riser keyway. The tubular riser provides for passage of oil upwardly in the reactor. A bubble cap is seated upon the riser in an umbrella- or mushroom-like manner to radially distribute the flow of oil in the reactor. The bubble cap has a specially designed slot which provides a bubble cap keyway that is aligned with the riser keyway.

Mounted on the bubble cap is a unique keeper. The unique keeper comprises a specially designed lock washer with at least one bendable locking tab or tang and a key which lockably engages and securely connects the bubble cap keyway and the riser keyway. A cap screw, bolt, or other fastener is connected to the riser and secured to the keeper. Advantageously, the locking tab of the keeper is of a size and shape and has sufficient mechanical strength to abuttingly engage and securely lock the head of the fastener to prevent rotation and removal of the fastener during operation of the reactor.

In the preferred form, the key and bubble cap keyway are substantially longer than the riser keyway to provide sufficient strength and material to weld the key to the bottom surface of the keeper. The keeper preferably has an enlarged arcuate support surface, segment, or base which is seated against and welded to the key in order to enhance the load-carrying strength and rigidity of the key.

A more detailed explanation of the invention is provided in the following description and appended claims taken in conjunction with the accompanying drawings.

BRIEF DESCRIPTION OF THE DRAWINGS

FIG. 1 is an assembly view of the bubble cap assembly and keeper in accordance with principles of the present invention;

FIG. 2 is a perspective view of the bubble cap assembly after installation;

FIG. 3 is a cross-sectional schematic view of a reactor containing the installed bubble cap assemblies;

FIG. 4 is an enlarged cross-sectional side view of the bubble cap assembly taken substantially along line 4-4 of FIG. 2;

FIG. 5 is a top view of the bubble cap;

FIG. 6 is a top view of the riser;

FIG. 7 is a top view of the keeper with one of the locking tabs bent after installation;

FIG. 8 is a top view of the bubble cap assembly;

FIG. 9 is a perspective view of the keeper;

FIG. 10 is a top view of the keeper prior to installation; and

FIG. 11 is a bottom view of the keeper.

DETAILED DESCRIPTION OF THE PREFERRED EMBODIMENT

Referring to FIG. 3, high-sulfur resid oil feed, also referred to as sour crude or vacuum-reduced crude, comprising 1000° F. resid and heavy gas oil, is fed into a resid hydrotreating unit (RHU) 10 along with a hydrogenrich feed gas. The resid hydrotreating unit comprises a series or set of ebullated (expanded) bed reactors 12. In the reactors, the resid is hydroprocessed (hydrotreated) in the presence of fresh and/or equilibrium hydrotreating catalyst and hydrogen to produce an upgraded effluent product stream leaving used spent catalyst. Hydroprocessing in the RHU includes demetalation, desulfurization, denitrogenation, resid conversion, oxygen removal (deoxygenation), and removal of Rams carbon.

The oil feed typically comprises resid oil (resid) and heavy gas oil. The feed gas comprises upgraded recycled gases and fresh make-up gases. Demetalation primarily occurs in the first ebullated bed reactor. Desulfurization occurs throughout the ebullated bed reactors. The effluent product stream typically comprises light hydrocarbon gases, hydrotreated naphtha, distillates, light and heavy gas oil, and unconverted hydrotreated resid. The hydrotreating catalyst typically comprises a hydrogenating component on a porous refractory, inorganic oxide support.

The resid hydrotreating unit is quite flexible and, if desired, the same catalyst can be fed to one or more of the reactors or a separate demetalation catalyst can be fed to the first reactor while a different catalyst can be fed to the second and/or third reactors. Alternatively, different catalysts can be fed to each of the reactors, if desired. The used spent catalyst typically contains nickel, sulfur, vanadium, and carbon (coke).

As shown in FIG. 3, the fresh hydrotreating catalyst is fed downwardly into top of the ebullated bed reactor 12 through a fresh catalyst feed line 14. Hot resid feed containing resid oil and heavy gas oil is fed through a resid feed line 16 and mixed with hydrogen-containing feed gases from a feed gas line 18 in a common oil-gas feed line 20. The oil and gas feed is directed upwardly in a uniform distribution by an annular feed distributor and header 22 in the lower portion of the reactor 12. The oil and gas flows upwardly through a distributor plate or grid 24 into the catalyst bed 26. The distributor plate or grid 24 comprises a bubble tray 28 and contains numerous bubble cap assemblies 30 which help distribute the oil and gas across the reactor 12 and prevent catalyst from falling into the bottom section of the reactor. An ebullating pump 32 circulates oil from a recycle pan 34 through a downcomer 36 and the distributor plate 24. The rate is sufficient to lift and expand the catalyst bed from its initial settled level to its steady state expanded level. The effluent product stream of partially hydrotreated oil and hydrogen-rich reactor tail gases (off gases) is withdrawn from the reactor through effluent product line 38. The used spent catalyst is withdrawn from the bottom of the reactor through spent catalyst discharge line 40. The spent catalyst typically contains deposits of metal, such as nickel and vanadium, which have been removed from the influent feed oil (resid) during hydrotreating.

Catalyst particles are suspended in a three-phase mixture of catalyst, oil, and hydrogen-rich feed gases in the reaction zone of the reactor 12. Hydrogen-rich feed gases typically continually bubble through the oil. The random ebullating motion of the catalyst particles results in a turbulent mixture of the phases which promotes good contact mixing and minimizes temperature gradients.

As shown in FIGS. 1, 2, and 4, each bubble cap assembly 30 has a vertically elongated tubular riser 42, a bubble cap 44, an annular keeper 46 comprising a lock washer, and a fastener 48, such as a cap screw or bolt.

The riser 42 extends upwardly in the reactor. The riser can be milled and fabricated from a piece of pipe. The riser has an annular tubular side wall 52 which is positioned about an axial (vertical) flow passageway and opening 54. The lower portion 56 of the riser 42 has an axial inlet opening and mouth 58 (FIG. 4) for ingress of the oil and gas feed. Preferably, the lower portion 56 of the riser 42 has a set of upwardly extending, elongated inlet slots 60 and 62 in communication with the axial flow passageway 54 to help receive the influent oil and gas feed. The inlet slots 60 and 62 are positioned below an annular flange 64. The annular flange 64 extends diametrically outwardly from and is welded to the side wall 52 to support the bubble tray 28. The annular flange 64, riser 42, and axial flow passageway 58 have a circular cross-sectional area.

The upper portion 66 of the riser 42 has a set of radially spaced, upwardly extended, elongated outlet slots 68, 70, and 72 in communication with the axial flow passageway 50. The outlet slots 68, 70, and 72 provide a plurality of outlets to radially discharge the oil and gas feed into the bubble cap 44. The upper portion 66 of the riser 42 has an upper end 74 (FIGS. 1 and 6) with an internally threaded recess or hole 75 about its vertical axis. The top of the upper end 74 has an offset, downwardly extending, vertical rectangular notch 76 which provides a riser keyway.

Positioned in the axial flow passageway 58 of the riser 42 is a one-way valve 77 (FIG. 4), such as a float valve, to accommodate upward passage of oil and gas feed while blocking and preventing downward back flow of the oil and gas feed in the axial flow passageway 58.

As shown in FIGS. 1, 2, and 5, the bubble cap 44 has an annular top plate 78 and an elongated annular skirt 80 which is welded to and depends downwardly from the annular top plate about the outlets 68, 70, and 72 of the riser 42 to deflect the oil and gas feed generally downwardly. The top plate 78 and the skirt 80 have a circular periphery and cross section.

As shown in FIGS. 4 and 5, the annular top plate 78 has a planar or flat top surface 82 and a planar or flat bottom surface 84 which is seated upon upper end 74 of the riser 42. The annular top plate has a circular, fastener-receiving or shaft-receiving, central opening and hole 86 to receive the shaft 88 of the cap screw (fastener) 48. An elongated radial slot 90 extends radially outwardly from the central opening 86 of the annular plate to provide a bubble cap keyway.

The skirt 80 (FIGS. 1, 2, and 4) of the bubble cap 44 has an elongated circular wall 92 which annularly surrounds the upper end 74 of the riser 42. The wall 92 has an upper attached end 94 which is welded or otherwise securely attached to and cantilevered from the periphery of the top plate 78. The lower unattached free end 96 of the wall 92 has an annular set of axially extending fins 98 which are positioned above the bubble tray 28. Positioned between the fins 98 are an annular array of radial notches 100 which provide fluid flow discharge passageways to radially discharge and direct the flow of the oil and gas feed into the reactor. The lower end of the skirt 80 can have radially extending feet 102 and 103 which provide abutment stops to engage a collar or the top portion of the bubble tray.

As best shown in FIGS. 9-11, the keeper or lock washer 46 has a planar or flat upper surface 104 (FIG. 10) and a planar or flat lower surface 106 which engages and seats upon the top surface 82 (FIGS. 1, 2, and 4) of the top plate 78 of the bubble cap 44. The lock washer 46 has a circular, shaft-receiving, central hole 108 which is aligned in registration with and has a similar diameter as the central opening 86 of the top plate 78 of the bubble cap 44. The lock washer 46 has a circular periphery 110 which is positioned concentrically about the central hole 108. Preferably, the circumferences and the maximum diameters of the peripheries of the lock washer 46 and the top plate 78 of the bubble cap 44 are similar in size.

The lock washer 46 (FIGS. 9–11) has an enlarged arcuate base or segment 112 which extends for about 85 degrees to about 95 degrees, preferably about 90 degrees, and provides a segmental quadrant support surface. Four bendable, locking tabs or tangs 114, 116, 118, and 120 are connected to the base 112 and extend arcuately about the central hole 108. Each of the tabs extends about 30 degrees to about 40 degrees and has a radial center (RC). The radial center of each tab is spaced about 55 degrees from the radial center of an adjacent tab. The tabs are spaced apart from each other and separated by generally trapezoidal openings 122.

The lock washer 46 has a radial, rectangular key 124 which extends vertically downwardly from the middle portion of the arcuate base 112. The key 124 is positioned radially outwardly of and offset from the central hole 108 (FIG. 1) of the keeper 46 to interlockingly engage the bubble cap keyway 90 and the riser keyway 76. The key 124 and bubble cap keyway 90 extend radially and have a similar radial span. The key 124 has a much greater radial span than the riser keyway 76 to provide sufficient mechanical strength and integrity of the key and to provide sufficient metal for welding to the base 112.

As shown in FIGS. 1 and 4, the cap screw or bolt providing the fastener 48 has an externally threaded shaft 88 and a hexagonal head 126 which is integrally connected and secured to the top of the shaft. The externally threaded shaft 88 threadedly engages the internally threaded upper end 74 of the riser 42 and matingly engages and passes through the central hole 108 of the keeper 46 and the central opening 86 of the top plate 78 of the bubble cap 44. The head 126 of the fastener 48 has an underside 128 which seats upon and compressively engages the upper surface 104 of the keeper 46. The head has hexagonal sides 130. Each of the hexagonal sides 130 has a face 132 which extends for about 60 degrees.

In order to prevent the fastener from rotating, one of the locking tabs 114, 116, 118, or 120 is bent to extend upwardly in the axial direction away from the key 124 to abut against and interlockingly engage one of the faces 132 of the head 126 of the fastener 48. Since the radial centers of the tabs are spaced apart by 55 degrees and the faces extend about 60 degrees, only one of the four locking tabs 114, 116, 118, or 120 will be positioned flushed against a corresponding mating face of the head of the fastener for any given rotational position of the fastener. The bent locking tab provides a transverse locking lug or upwardly extending locking finger 134 (FIGS. 2, 4, 7, and 8).

In order to disassemble the bubble cap assembly 30 for periodic maintenance and decoking, the bent locking tab 134 is bent in a horizontal direction in coplanar alignment with the other tabs 114, 116, and 120 to allow counter rotation and removal of the fastener 48 and subsequent removal of the keeper 46 and bubble cap. After decoking and cleaning, the bubble cap assembly 30 can be reassembled without further welding by reinstalling the bubble cap 44, keeper 46, and fastener 48, thereafter bending the locking lug (tab) 134 upwardly and perpendicularly away from the upper surface 104 of the keeper 46 in the manner described above to lockingly abut against a mating face 132 of the head 126 of the fastener 48.

Among the many advantages of the novel bubble cap assembly and keeper are:
1. Ease of maintenance, decoking, and cleaning.
2. Superior reliability during installation and use.
3. Minimize damage to the bubble cap and the welds during removal and maintenance.
4. Enhance profitability of the reactor.
5. Less downtime.
6. Easy to use and install.
7. Simple to fabricate.
8. Economical.
9. Efficient.
10. Effective.

Although an embodiment of the invention has been shown and described, it is to be understood that various modifications and substitutions, as well as rearrangements and combinations of parts and components, can be made by those skilled in the art without departing from the novel spirit and the scope of this invention.

What is claimed is:

1. A bubble cap assembly for use in a reactor in a hydrocarbon processing plant, comprising:

a tubular riser for injecting hydrocarbons generally upwardly in a reactor, said riser defining a notch providing a riser keyway;

a bubble cap seated upon said riser in an umbrellalike manner for radially distributing the flow of hydrocarbons in a reactor, said bubble cap defining a slot providing a bubble cap keyway;

a keeper comprising a lock washer having at least one bendable locking tab and a key for lockably engaging said bubble cap keyway and said riser keyway; and a fastener positioned upon said keeper and connected to said riser; and said locking tab being of a size and shape and having sufficient mechanical strength for securely engaging and locking said fastener to substantially prevent rotation and removal of said fastener during operation of said reactor.

2. A bubble cap assembly in accordance with claim 1 wherein said fastener comprises a hexagonal cap screw.

3. A bubble cap assembly in accordance with claim 1 wherein said fastener comprises a hexagonal bolt.

4. A bubble cap assembly in accordance with claim 1 wherein said bubble cap keyway is substantially longer than said riser keyway.

5. A bubble cap assembly in accordance with claim 4 wherein said key has a greater span than said riser keyway.

6. A bubble cap assembly in accordance with claim 1 wherein said key comprises an axially extending key.

7. A bubble cap assembly in accordance with claim 6 wherein said keeper has an enlarged arcuate support surface seated against and weldably secured to said key for enhancing the load-carrying strength and rigidity of said key, said arcuate support surface being substantially larger than and positioned substantially perpendicular to said axially extending key.

8. A bubble cap assembly for use in a reactor in an oil refinery, comprising:

an elongated, upwardly extending tubular riser defining an axial flow passageway extending generally upwardly in a reactor and an annular sidewall positioned about said axial flow passageway, said riser having a lower portion defining at least one inlet for receiving a feed comprising oil, an annular flange extending diametrically outwardly from said sidewall for supporting a bubble tray, an upper portion defining a set of radially spaced, upwardly extending, elongated outlet slots providing a plurality of outlets in communication with said axial flow passageway for radially discharging said oil, and an internally threaded upper end defining an offset downwardly extending notch providing a riser keyway;

a bubble cap having an annular top plate and an elongated annular skirt depending downwardly from said annular top plate about said outlets of said riser for deflecting said oil generally downwardly, said annular top plate and said skirt having a substantially circular periphery, said annular top plate having a substantially planar top surface and a substantially planar bottom surface seated upon said upper end of said riser, said annular top plate defining a substantially circular, fastener-receiving central opening and an elongated radial slot extending radially outwardly from said opening providing a bubble cap keyway, said skirt having an elongated circular wall annularly surrounding said upper end of said riser, said wall having an upper attached end securely attached to and cantilevered from said periphery of said top plate and an unattached lower free end comprising an annular set of axially extending fins defining an annular array of radial notches providing fluid flow discharge passageways positioned above said tray to radially discharge and direct the flow of said oil into said reactor;

an annular keeper comprising a lock washer having a generally planar upper surface and a generally planar lower surface for engaging and seating upon said top surface of said top plate of said bubble cap, said lock washer defining a substantially circular, shaft-receiving central hole aligned in registration to and having a substantially similar diameter as said central opening in said top plate of said bubble cap, said lock washer having a periphery positioned substantially concentrically about said central hole and spanning a maximum diameter substantially similar to the diameter of the circular periphery of said top plate of said bubble cap, said lock washer having an arcuate base providing an segmental quadrant support surface extending about 90 degrees and having four bendable, radial, locking tabs connected to said arcuate base and extending arcuately about said central hole, each of said tabs extending about 30 degrees to about 40 degrees and having a radial center, the radial center of each tab being spaced about 55 degrees from the radial center of an adjacent tab, said tabs being spaced from each other to define generally trapezoidal openings therebetween, said lock washer having a radial key extending downwardly from the middle portion of said arcuate base and positioned radially outwardly of and offset from said central hole for interlockingly engaging said bubble cap keyway and said riser keyway;

a fastener selected from the group consisting of a cap screw and a bolt, said fastener having an externally threaded shaft for threadedly engaging said internally threaded upper end of said riser and matingly engaging said central hole of said annular keeper and said central opening of said top plate of said bubble cap, said fastener having a substantially hexagonal head integrally connected to said shaft, said head having an underside for seating upon and compressively engaging said upper surface of said annular keeper and substantially hexagonal sides, each of said sides having a face extending about 60 degrees; and one of said locking tabs of said annular keeper being bent and extending upwardly in an axial direction away from said key to provide a transverse locking lug for interlockingly engaging and abutting against one of said faces of said head of said fastener to substantially prevent said fastener from rotating.

9. A bubble cap assembly in accordance with claim 8 wherein said key and said notch are substantially rectangular.

10. A bubble cap assembly in accordance with claim 9 wherein said key and slot extend radially and have a substantially greater radial span than said notch.

11. A bubble cap assembly in accordance with claim 10 wherein said key and slot have a substantially similar radial span.

12. A bubble cap assembly in accordance with claim 8 wherein said lower portion of said riser defines a set of upwardly extending, elongated inlet slots positioned below said annular flange and in communication with said axial flow passageway.

13. A bubble cap assembly in accordance with claim 12 wherein said riser has a one-way valve positioned in said axial flow passageway for accommodating upward passage of oil but substantially blocking downward back flow of oil in said axial flow passageway.

14. A bubble cap assembly in accordance with claim 13 wherein said lower end of said skirt of said bubble cap has radially extending feet providing abutment stops for engaging the top portion of said bubble tray.

* * * * *

UNITED STATES PATENT OFFICE
CERTIFICATE OF CORRECTION

Patent No. 4,715,996                                        Dated December 29, 1987

Inventor(s) GEORGE G. LAMBOUSY - BENJAMIN H. REAVES - WILLIAM E. NELSON

It is certified that error appears in the above-identified patent and that said Letters Patent are hereby corrected as shown below:

Patent reads

| Col. | Line  |                                                            |
|------|-------|------------------------------------------------------------|
| 1    | 39    | "unde-sirable" should be -- undesirable --                 |
| 2    | 67    | "hydrogenrich" should be -- hydrogen-rich --               |
| 3    | 29    | "into top" should be -- into the top --                    |
| 3    | 38    | " flows" should be -- flow --                              |
| 3    | 42-43 | "prevent catalyst" -- should be -- prevent the catalyst -- |
| 4    | 42    | "upon upper" should be -- upon the upper --                |
| 6    | 32    | "umbrellalike" should be -- umbrella-like --               |
| 7    | 52    | "an segmental" should be -- a segmental --                 |

Signed and Sealed this

Sixteenth Day of August, 1988

Attest:

DONALD J. QUIGG

Attesting Officer           Commissioner of Patents and Trademarks